(12) United States Patent
Sugita

(10) Patent No.: US 10,571,670 B2
(45) Date of Patent: Feb. 25, 2020

(54) ZOOM LENS AND IMAGE PICKUP APPARATUS INCLUDING THE SAME

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 15/928,548

(22) Filed: Mar. 22, 2018

(65) Prior Publication Data

US 2018/0275382 A1  Sep. 27, 2018

(30) Foreign Application Priority Data

Mar. 23, 2017  (JP) .................................. 2017-057114

(51) Int. Cl.
| | |
|---|---|
| *G02B 15/14* | (2006.01) |
| *G02B 15/177* | (2006.01) |
| *G03B 5/02* | (2006.01) |
| *G02B 13/02* | (2006.01) |

(52) U.S. Cl.
CPC .......... *G02B 15/177* (2013.01); *G02B 13/02* (2013.01); *G03B 5/02* (2013.01); *G03B 2205/0046* (2013.01)

(58) Field of Classification Search
CPC ...... G02B 7/04; G02B 13/009; G02B 15/173; G02B 15/177; G02B 15/00
USPC ................. 359/676–706, 822–826
See application file for complete search history.

(56) References Cited

U.S. PATENT DOCUMENTS

| | | | |
|---|---|---|---|
| 9,110,278 B2 | 8/2015 | Sugita | |
| 9,250,424 B2 | 2/2016 | Sugita | |
| 9,268,118 B2 | 2/2016 | Sugita | |
| 9,268,119 B2 | 2/2016 | Sugita | |
| 9,465,203 B2 | 10/2016 | Sugita | |
| 9,575,391 B2 | 2/2017 | Sugita | |
| 9,638,904 B2 | 5/2017 | Sugita | |
| 9,933,603 B2 | 4/2018 | Sugita | |
| 2010/0302648 A1 | 12/2010 | Hatada | |
| 2017/0242228 A1 | 8/2017 | Sugita | |
| 2017/0261728 A1* | 9/2017 | Shibata | .................. G02B 15/20 |
| 2017/0322399 A1 | 11/2017 | Sugita | |

(Continued)

FOREIGN PATENT DOCUMENTS

| | | | |
|---|---|---|---|
| JP | 2008-046208 A | 2/2008 | |
| JP | 2008-233585 A | 10/2008 | |
| WO | WO-2016031256 A1 * | 3/2016 | ............. G02B 15/20 |

*Primary Examiner* — Mahidere S Sahle
(74) *Attorney, Agent, or Firm* — Carter, DeLuca & Farrell LLP

(57) ABSTRACT

Provided is a zoom lens, including, in order from an object side to an image side: a negative first lens unit; a positive second lens unit; a negative third lens unit; a positive fourth lens unit; and a positive fifth lens unit, the first, second, third, fourth, and fifth lens units having an interval between each pair of adjacent lens units changed for zooming. The second, fourth, and fifth lens units are configured to move toward the object side for zooming from a wide-angle end to a telephoto end. A focal length of the fourth lens unit, a focal length of the fifth lens unit, an amount of movement of the fifth lens unit for zooming from the wide-angle end to the telephoto end, and a focal length of an entire system of the zoom lens at the wide-angle end are each appropriately set.

14 Claims, 9 Drawing Sheets

(56) References Cited

U.S. PATENT DOCUMENTS

2017/0351113 A1 12/2017 Inoue et al.
2018/0196223 A1* 7/2018 Umeda .................. G02B 15/20

* cited by examiner

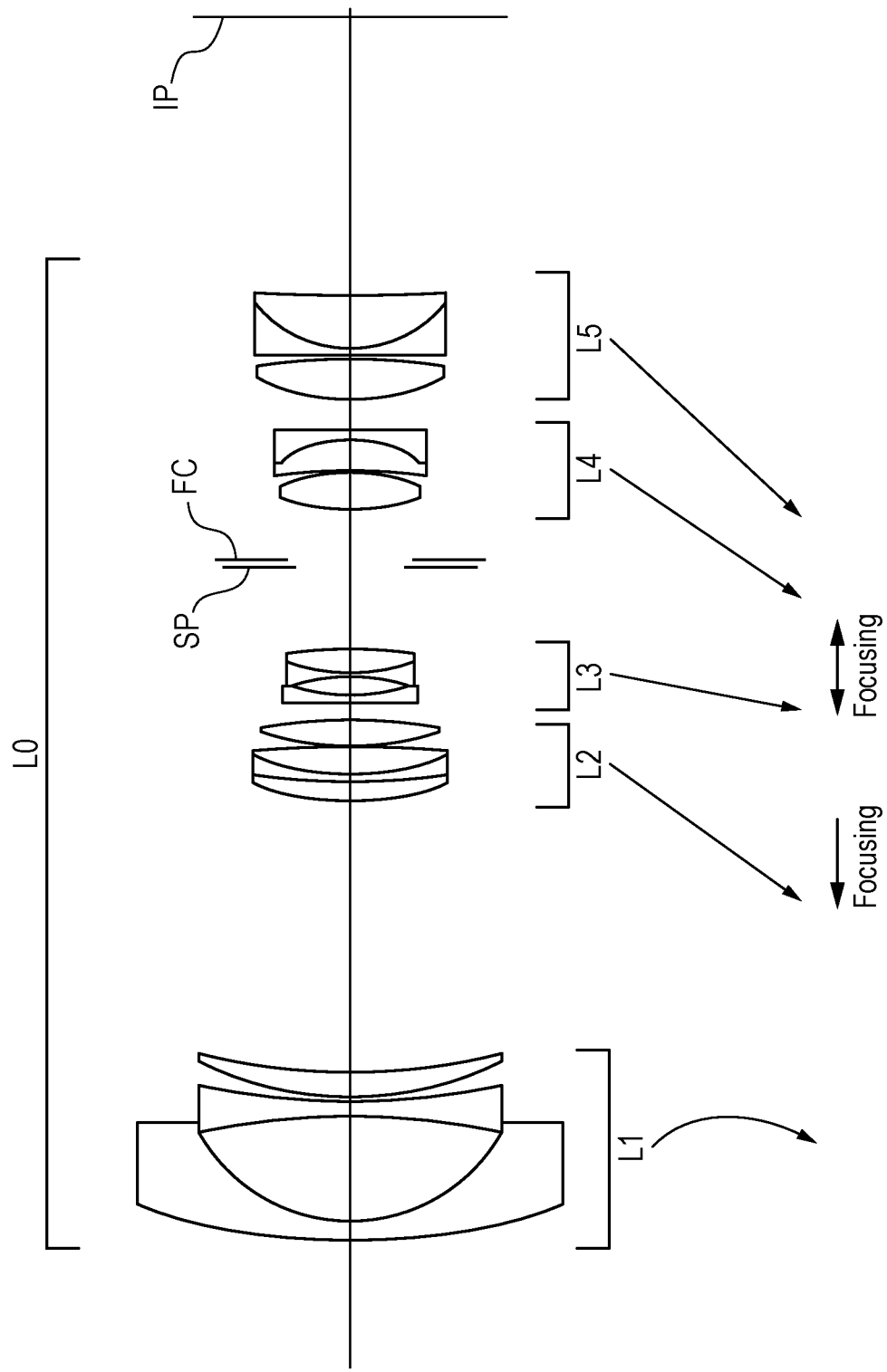

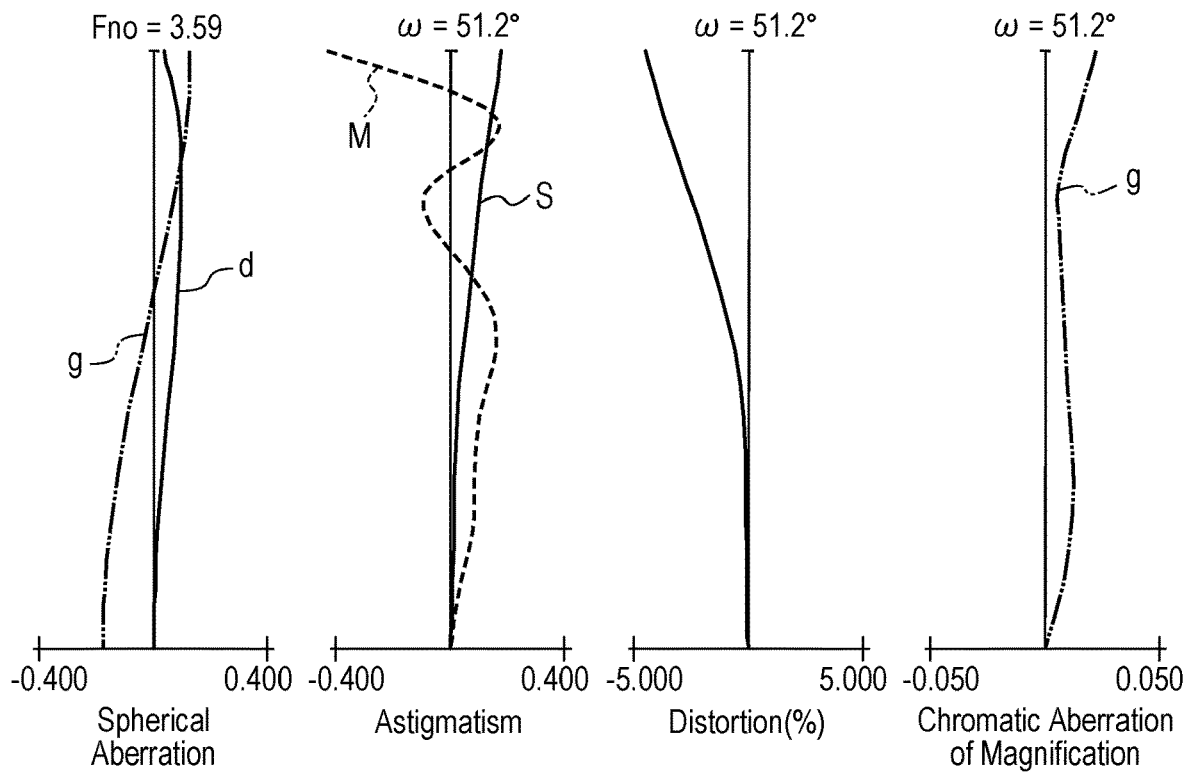
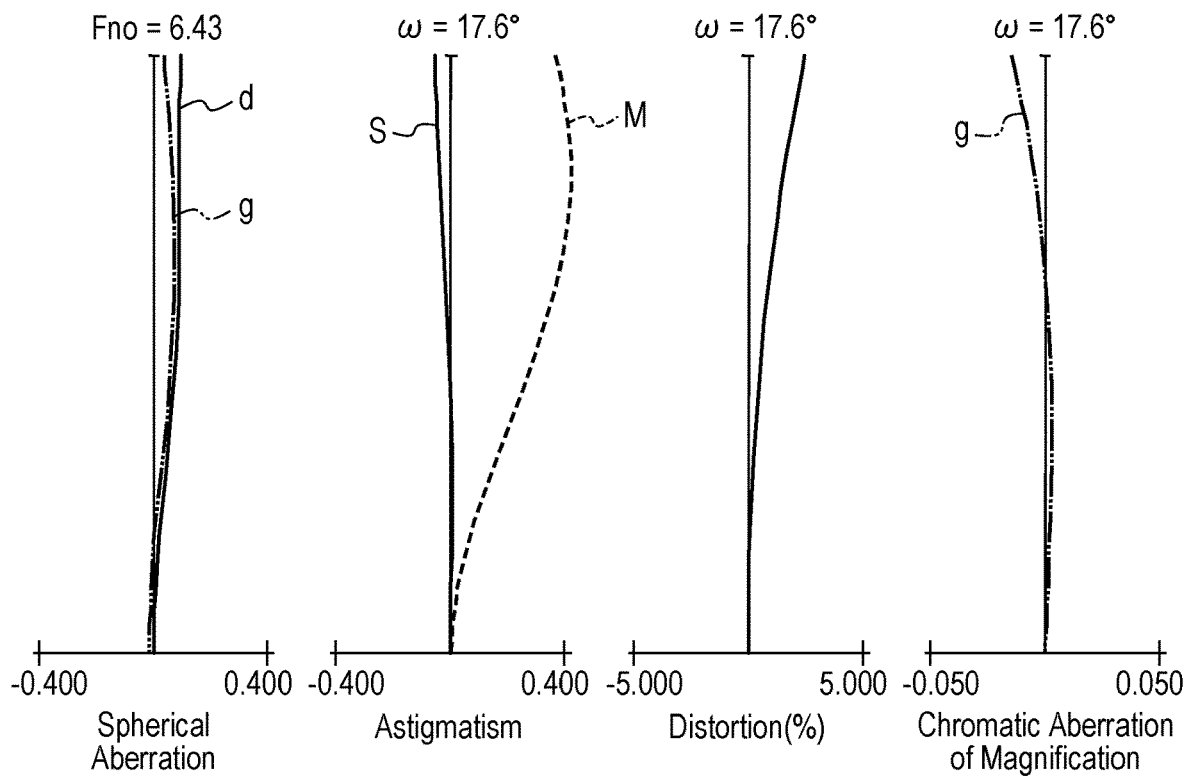

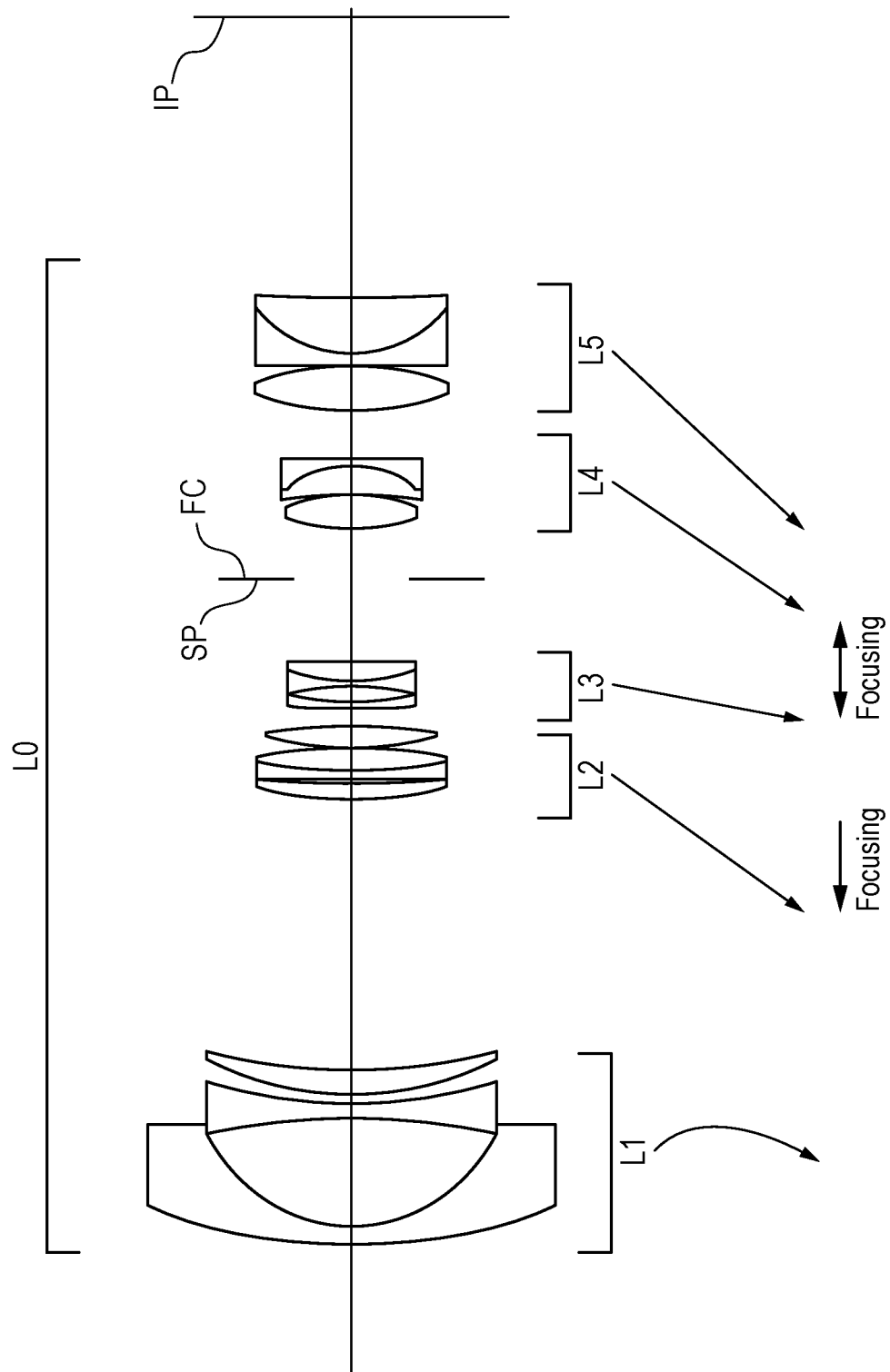

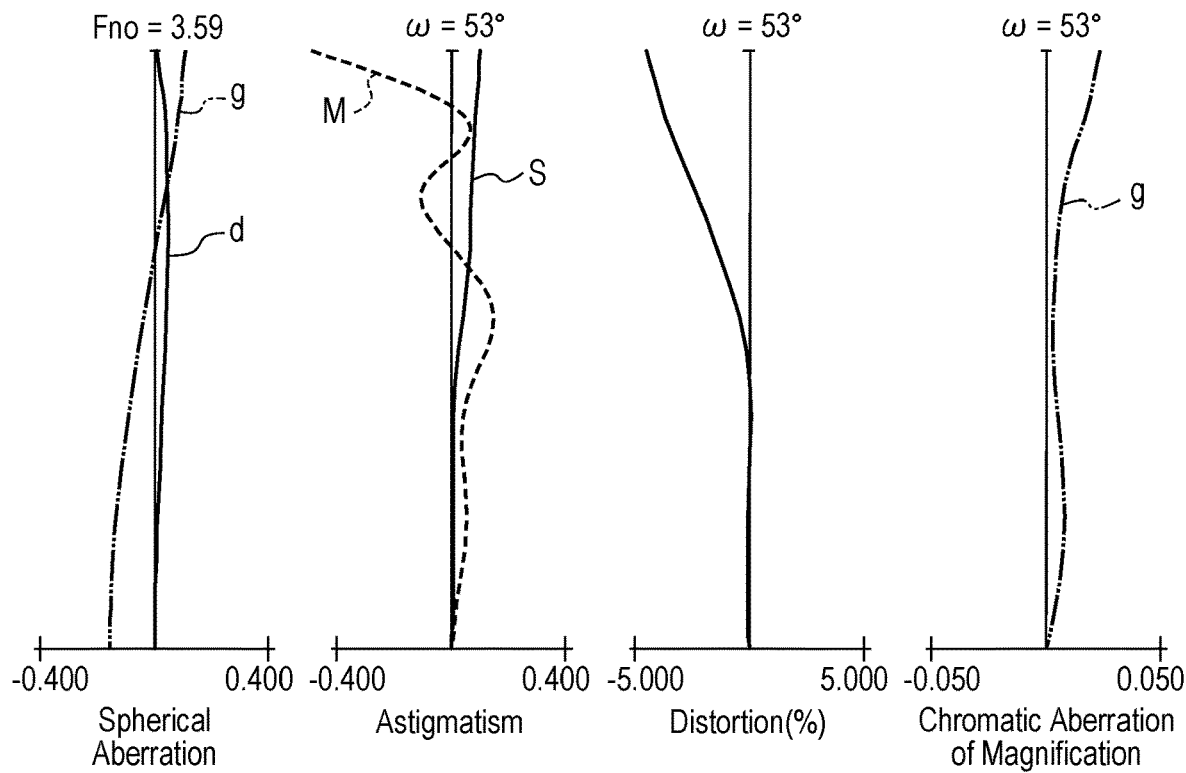
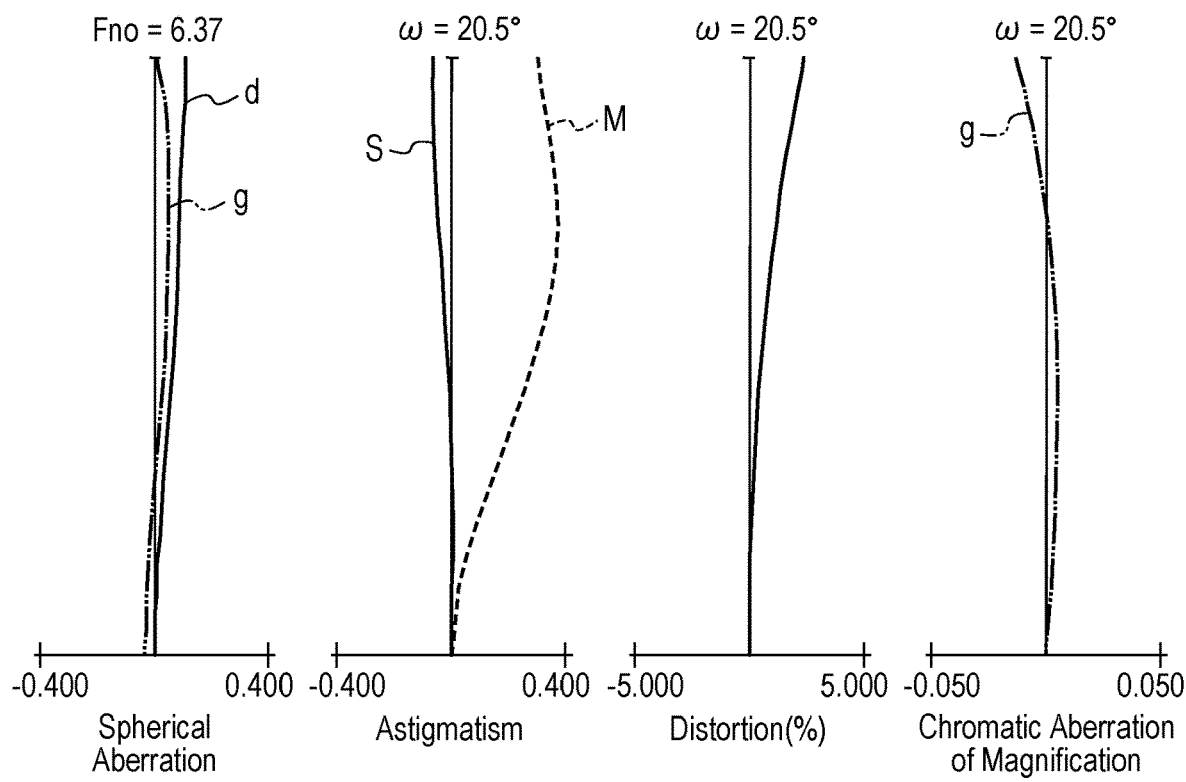

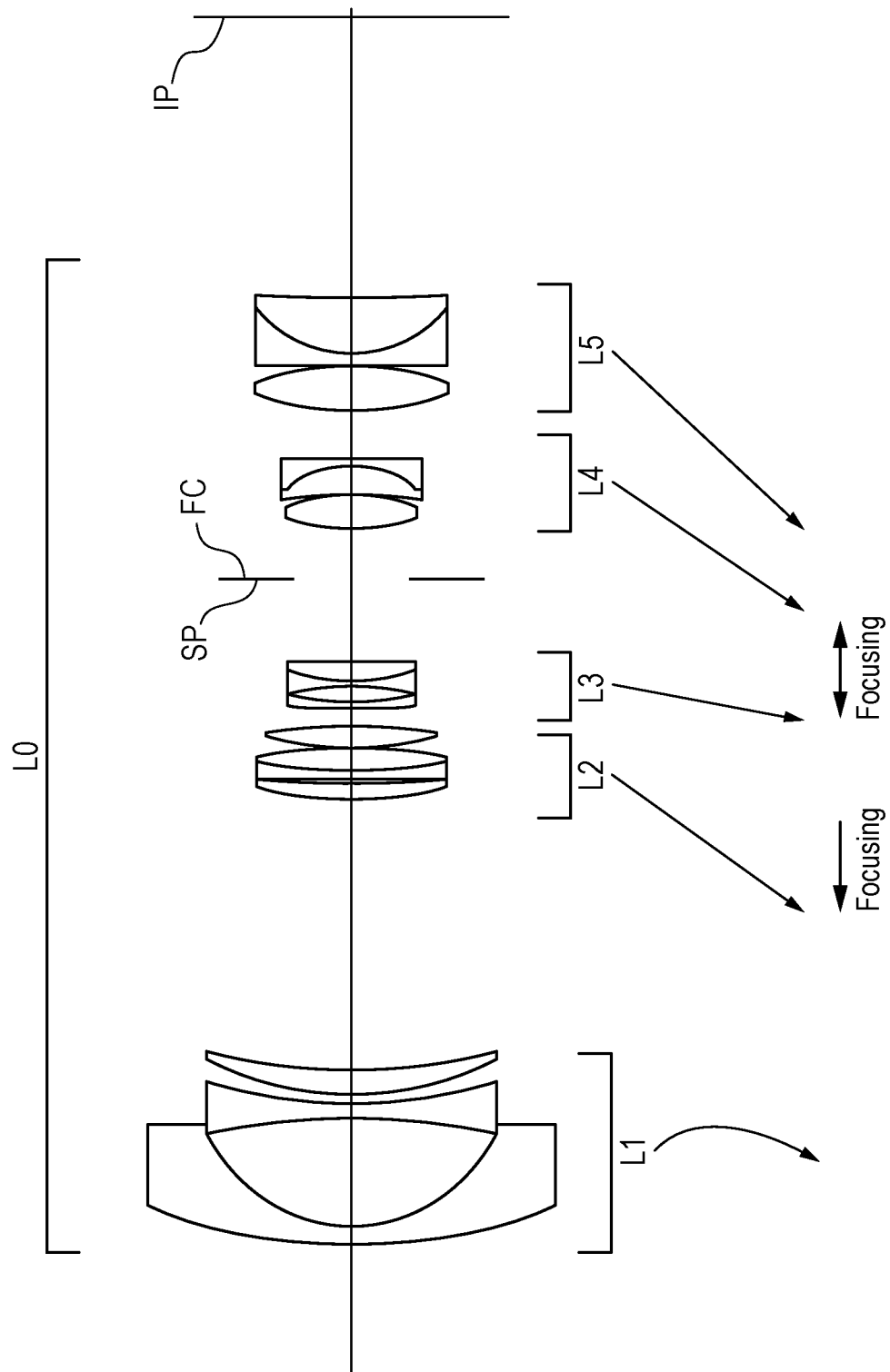

ZOOM LENS AND IMAGE PICKUP APPARATUS INCLUDING THE SAME

BACKGROUND OF THE INVENTION

Field of the Invention

The present invention relates to a zoom lens and is suitable as an image pickup optical system of an image pickup apparatus such as a digital still camera, a video camera, a TV camera, or a monitoring camera.

Description of the Related Art

In recent years, a wide-angle type zoom lens is required to be short and compact, and to have a wide angle of view, large magnification and high optical performance (high resolution).

In the related art, there have been known, as zoom lenses that are small in size as the entire system and have a wide angle of view, negative lead type zoom lenses in which a lens unit having a negative refractive power is arranged closest to an object side. Of those negative lead type zoom lenses, there are known zoom lenses having a wide entire image pickup angle of view of from about 80° to about 110° (Japanese Patent Application Laid-Open Nos. 2008-046208 and 2008-233585).

In Japanese Patent Application Laid-Open No. 2008-046208, there is disclosed a zoom lens including a first lens unit having a negative refractive power, a second lens unit having a positive refractive power, a third lens unit having a negative refractive power, and a fourth lens unit having a positive refractive power, the zoom lens having an entire image pickup angle of view of 106° at a wide-angle end, a zoom ratio of about 2.1. In Japanese Patent Application Laid-Open No. 2008-233585, there is disclosed a zoom lens including a first lens unit having a negative refractive power, a second lens unit having a positive refractive power, a third lens unit having a negative refractive power, a fourth lens unit having a positive refractive power, and a fifth lens unit having a positive refractive power, the zoom lens having an entire image pickup angle of view of 82° at a wide-angle end, and a zoom ratio of about 2.73.

In addition, there have been known, as zoom lenses that are small in size as the entire system and have a wide angle of view, positive lead type zoom lenses in which a lens unit having a positive refractive power is arranged closest to an object side (U.S. Patent Application Publication No. 2010/0302648). In U.S. Patent Application Publication No. 2010/0302648, there has been disclosed a zoom lens including, in order from the object side to an image side, a first lens unit having a positive refractive power, a second lens unit having a negative refractive power, a third lens unit having a positive refractive power, and a fourth lens unit having a positive refractive power, the zoom lens having an entire image pickup angle of view of 83° at a wide-angle end, and a zoom ratio of about 6.

In order to achieve a wide angle of view, downsizing of the entire system, and high resolution in a zoom lens, it is important to appropriately set lens configurations of respective lens units forming the zoom lens, refractive powers of the respective lens units, and a zoom type, for example.

SUMMARY OF THE INVENTION

It is an object of the present invention to provide a zoom lens that is small in size as a whole, and has a wide angle of view and high optical performance over the entire zoom range, and an image pickup apparatus including the zoom lens.

According to one embodiment of the present invention, there is provided a zoom lens, including, in order from an object side to an image side:

a first lens unit having a negative refractive power;
a second lens unit having a positive refractive power;
a third lens unit having a negative refractive power;
a fourth lens unit having a positive refractive power; and
a fifth lens unit having a positive refractive power,
    the first lens unit, the second lens unit, the third lens unit, the fourth lens unit, and the fifth lens unit having an interval between each pair of adjacent lens units changed for zooming,
in which the second lens unit, the fourth lens unit, and the fifth lens unit are configured to move toward the object side for zooming from a wide-angle end to a telephoto end, and
in which the following conditional expressions are satisfied:

$$0.01 < f5/f4 < 0.50; \text{ and}$$

$$1.8 < -M5/fw < 10.0,$$

where f4 represents a focal length of the fourth lens unit, f5 represents a focal length of the fifth lens unit, M5 represents an amount of movement of the fifth lens unit for zooming from the wide-angle end to the telephoto end, and fw represents a focal length of the zoom lens at the wide-angle end.

Further features of the present invention will become apparent from the following description of exemplary embodiments with reference to the attached drawings.

BRIEF DESCRIPTION OF THE DRAWINGS

FIG. 1 is a lens cross-sectional view of a zoom lens according to Embodiment 1 of the present invention.

FIG. 2A is an aberration diagram of the zoom lens according to Embodiment 1 when an object distance is infinity at a wide-angle end.

FIG. 2B is an aberration diagram of the zoom lens according to Embodiment 1 when the object distance is infinity at a telephoto end.

FIG. 3 is a lens cross-sectional view of a zoom lens according to Embodiment 2 of the present invention.

FIG. 4A is an aberration diagram of the zoom lens according to Embodiment 2 when an object distance is infinity at a wide-angle end.

FIG. 4B is an aberration diagram of the zoom lens according to Embodiment 2 when the object distance is infinity at a telephoto end.

FIG. 5 is a lens cross-sectional view of a zoom lens according to Embodiment 3 of the present invention.

DESCRIPTION OF THE EMBODIMENTS

Now, exemplary embodiments of the present invention are described in detail with reference to the attached drawings. A zoom lens according to each of Embodiments of the present invention includes, in order from an object side to an image side: a first lens unit having a negative refractive power; a second lens unit having a positive refractive power; a third lens unit having a negative refractive power; a fourth lens unit having a positive refractive power; and a fifth lens unit having a positive refractive power. The second lens unit, the fourth lens unit, and the fifth lens unit are configured to move toward an object side during zooming from a wide-angle end to a telephoto end, and an interval between each pair of adjacent lens units is changed during zooming. A sixth lens unit having a positive refractive power, which is configured not to move during zooming, may be arranged on the image side of the fifth lens unit.

FIG. 1 is a lens cross-sectional view of a zoom lens according to Embodiment 1 of the present invention at a wide-angle end (short focal length end). FIG. 2A is an aberration diagram of the zoom lens according to Embodiment 1 at the wide-angle end, and FIG. 2B is an aberration diagram of the zoom lens according to Embodiment 1 at a telephoto end (long focal length end). The zoom lens of Embodiment 1 has a zoom ratio of 3.91, an f number of from 3.59 to 6.43, and an image pickup angle of view of from about 102.38 to about 35.3.

FIG. 3 is a lens cross-sectional view of a zoom lens according to Embodiment 2 of the present invention at a wide-angle end. FIG. 4A is an aberration diagram of the zoom lens according to Embodiment 2 at the wide-angle end, and FIG. 4B is an aberration diagram according to Embodiment 2 of the zoom lens at a telephoto end. The zoom lens of Embodiment 2 has a zoom ratio of 3.56, an f number of from 3.59 to 6.37, and an image pickup angle of view of from about 106.02 to about 40.92.

Figure 6A:
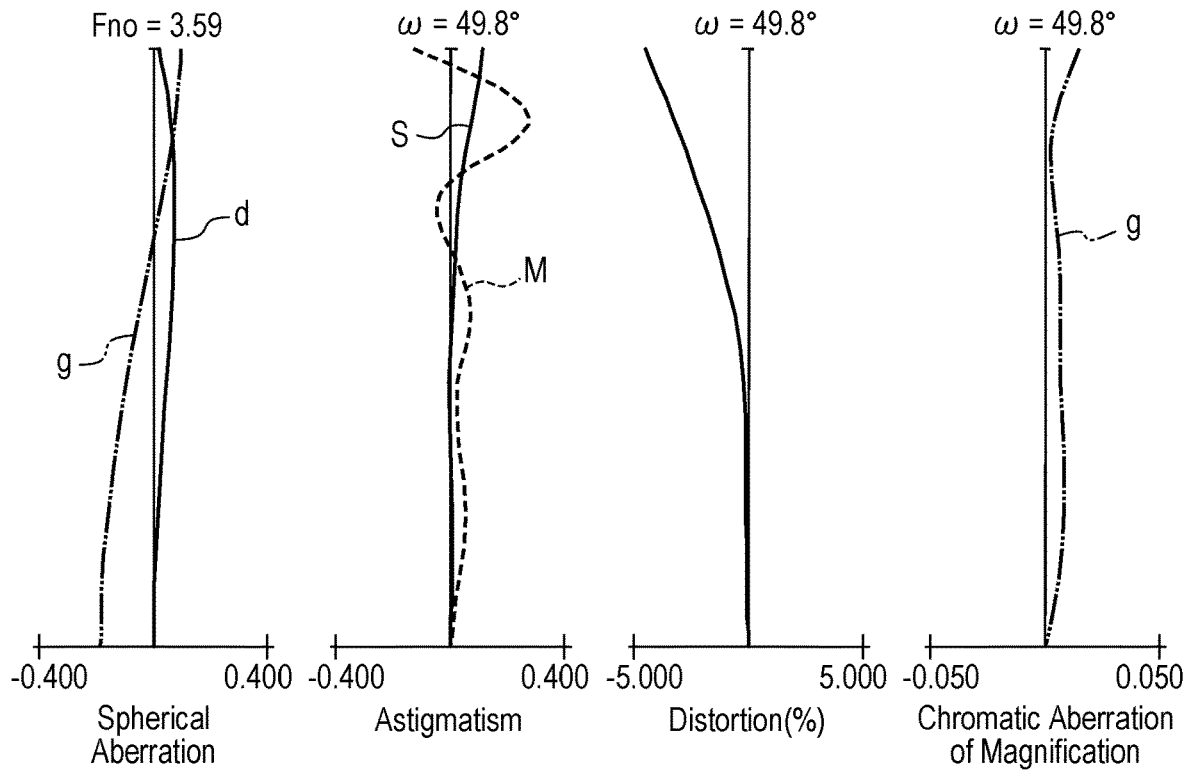
FIG. 6A is an aberration diagram of the zoom lens according to Embodiment 3 when an object distance is infinity at a wide-angle end.
Figure 6B:
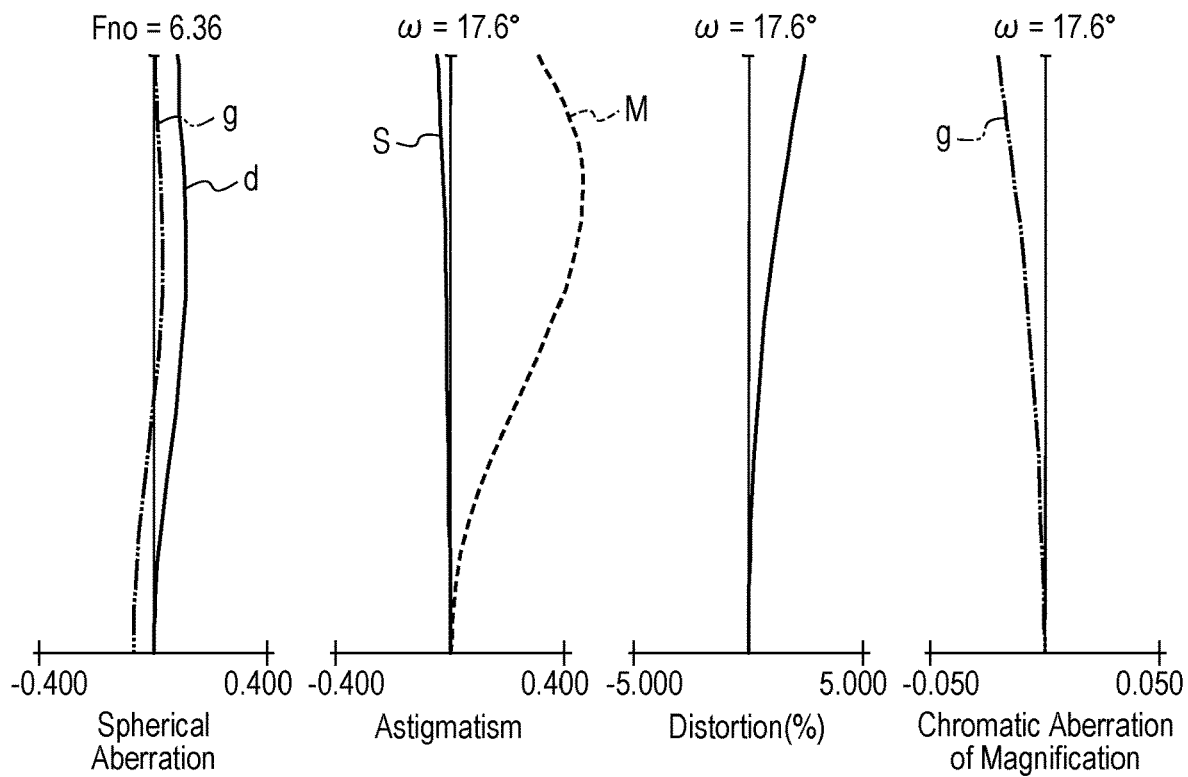
FIG. 6B is an aberration diagram of the zoom lens according to Embodiment 3 when the object distance is infinity at a telephoto end.

FIG. 5 is a lens cross-sectional view of a zoom lens according to Embodiment 3 of the present invention at a wide-angle end. FIG. 6A is an aberration diagram of the zoom lens according to Embodiment 3 at the wide-angle end, and FIG. 6B is an aberration diagram of the zoom lens according to Embodiment 3 at a telephoto end. The zoom lens of Embodiment 3 has a zoom ratio of 3.72, an f number of from 3.59 to 6.36, and an image pickup angle of view of from about 99.54 to about 35.3.

Figure 7:
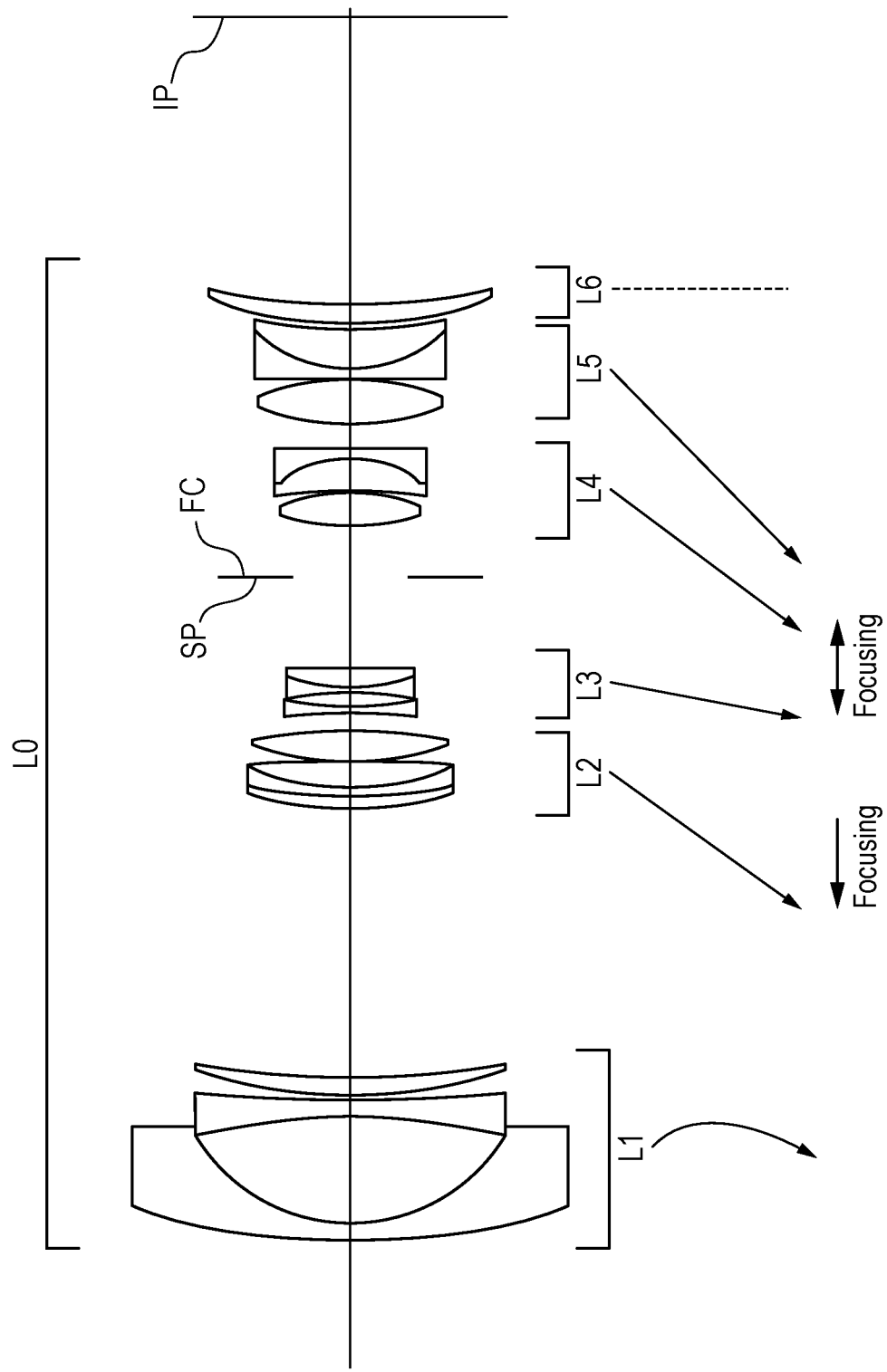
FIG. 7 is a lens cross-sectional view of a zoom lens according to Embodiment 4 of the present invention.
Figure 8A:
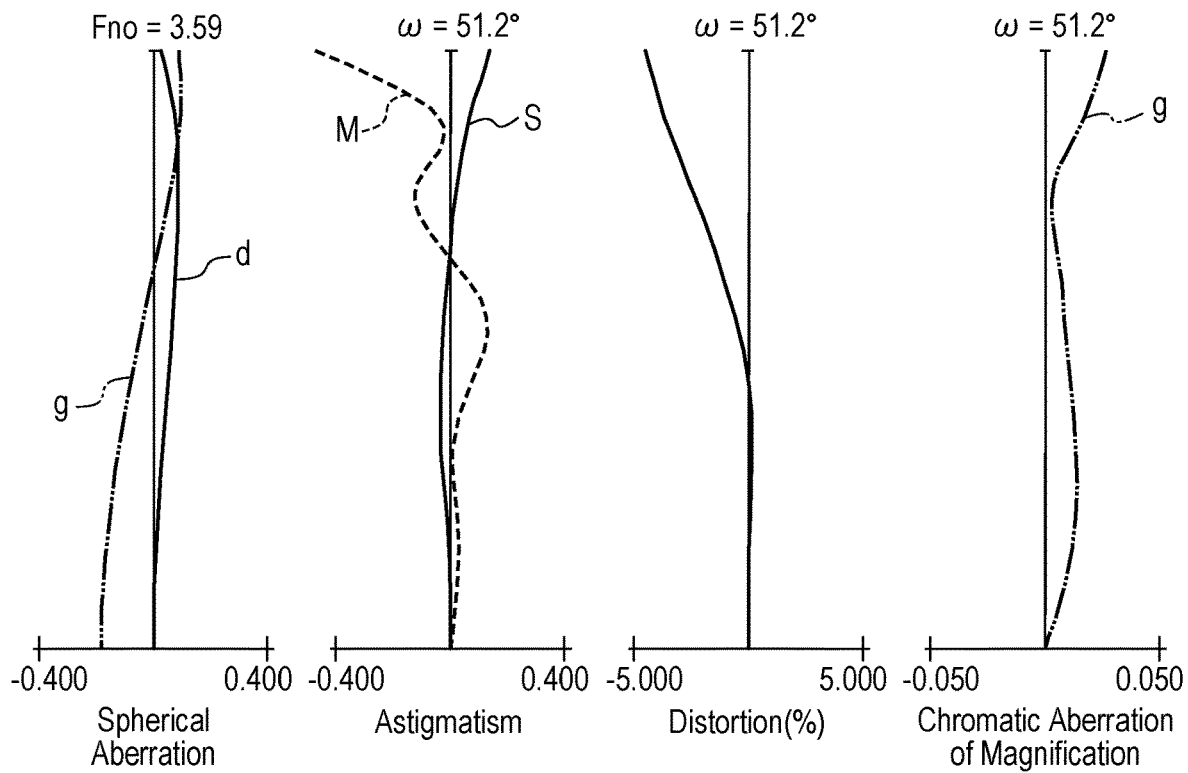
FIG. 8A is an aberration diagram of the zoom lens according to Embodiment 4 when an object distance is infinity at a wide-angle end.
Figure 8B:
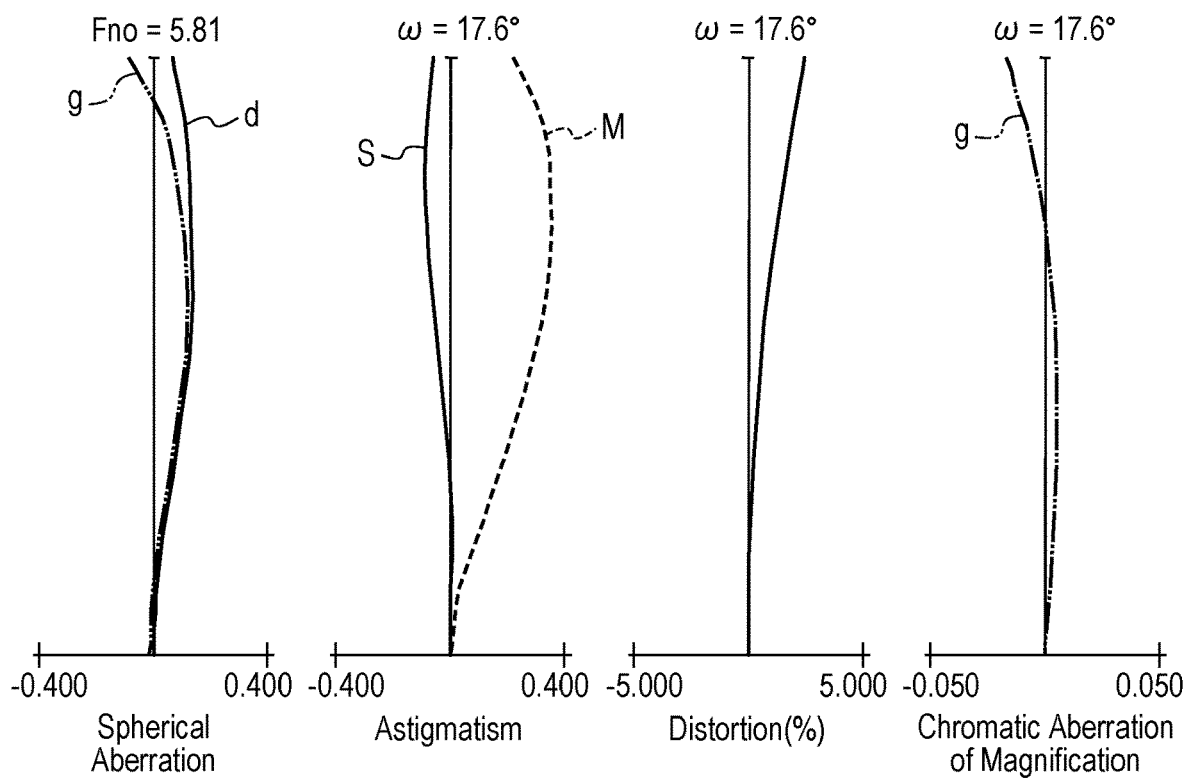
FIG. 8B is an aberration diagram of the zoom lens according to Embodiment 4 when the object distance is infinity at a telephoto end.

FIG. 7 is a lens cross-sectional view of a zoom lens according to Embodiment 4 of the present invention at a wide-angle end. FIG. 8A is an aberration diagram of the zoom lens according to Embodiment 4 at the wide-angle end, and FIG. 8B is an aberration diagram of the zoom lens according to Embodiment 4 at a telephoto end. The zoom lens of Embodiment 4 has a zoom ratio of 3.91, an f number of from 3.59 to 5.81, and an image pickup angle of view of from about 102.38 to about 35.3.

Figure 9:
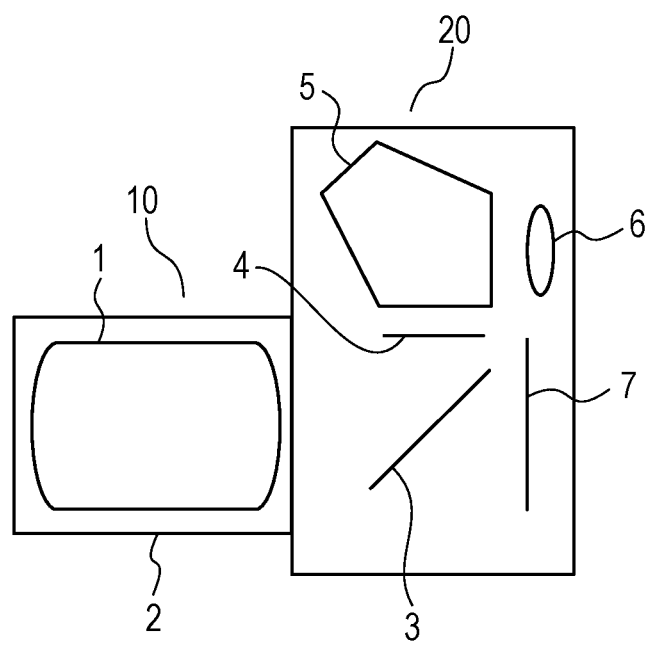
FIG. 9 is a schematic diagram of a main part of an image pickup apparatus according to an Embodiment of the present invention.

FIG. 9 is a schematic diagram of a main part of a digital still camera (image pickup apparatus) including the zoom lens. The left side corresponds to the object side (front side) and the right side corresponds to the image side (rear side). In the lens cross-sectional view, L0 represents the zoom lens. Moreover, i represents the order of each lens unit from the object side to the image side, and Li represents the i-th lens unit.

SP represents an aperture stop configured to constrict light to a desired f number during use of the zoom lens. FC represents a flare cut stop configured to block unnecessary light. IP represents an image plane. When the zoom lens is used as an image pickup optical system of a video camera or a digital still camera, an image pickup plane of a solid-state image pickup element (photoelectric conversion element), such as a CCD sensor or a CMOS sensor, is arranged. In addition, when the zoom lens is used as an image pickup optical system of a silver-halide film camera, a photosensitive plane corresponding to a film plane is arranged. In the spherical aberration diagram, the solid line "d" indicates the d-line (at a wavelength of 587.6 nm), and the two-dot chain line "g" indicates the g-line (at a wavelength of 435.8 nm).

In the astigmatism diagram, the dotted line "M" indicates a meridional image plane of the d-line, and the solid line "S" indicates a sagittal image plane of the d-line. In addition, the chromatic aberration of magnification indicates a difference of the g-line with reference to the d-line. Fno represents an f number. A symbol ω represents an image pickup half angle of view (degrees). In the following Embodiments, the wide-angle end and the telephoto end are zoom positions when a magnification-varying lens unit is located at each end of a mechanically movable range on the optical axis.

In the lens cross-sectional view, the arrow indicates a movement locus of each lens unit for zooming from the wide-angle end to the telephoto end. The arrows regarding focusing indicate directions of movement during focusing from infinity to close distance.

The above-mentioned zoom lens described in Japanese Patent Application Laid-Open No. 2008-046208 is a four-unit zoom lens including, in order from an object side to an image side, a first lens unit having a negative refractive power, a second lens unit having a positive refractive power, a third lens unit having a negative refractive power, and a fourth lens unit having a positive refractive power. The zoom lens as a whole adopts a retrofocus type power arrangement, in which the first lens unit having the negative refractive power, and a composite lens unit having a positive refractive power, which is formed of the second and subsequent lens units, are arranged, and achieves a super wide image pickup angle of view exceeding 100°.

Further, the zoom lens is based on a configuration of a short zoom lens, in which an interval between the lens unit having the negative refractive power and the lens unit having the positive refractive power is reduced during zooming from a wide-angle end to a telephoto end. The second and subsequent lens units are divided into lens units having positive, negative, and positive refractive powers, and the lens unit having the negative refractive power in the middle is configured to move toward the image side relatively to the lens units having the positive refractive powers to assist in magnification and correct aberrations. A zoom configuration based on the retrofocus type short zoom lens has had a tendency to generate sagittal curvature of field at a peripheral angle of view at the wide-angle end and astigmatism at a small image height at the telephoto end contrary to each other. Therefore, it is difficult to achieve a high zoom ratio.

The zoom lens described in Japanese Patent Application Laid-Open No. 2008-233585 is a five-unit zoom lens including, in order from an object side to an image side, a first lens unit having a negative refractive power, a second lens unit having a positive refractive power, a third lens unit having a negative refractive power, a fourth lens unit having a positive refractive power, and a fifth lens unit having a positive refractive power. The fifth lens unit is configured not to move during zooming, and plays a role of allowing an off-axial ray to enter an image plane in a state close to telecentricity. The zoom lens described in U.S. Patent Application Publication No. 2010/0302648 is a four-unit zoom lens including, in order from an object side to an image side, a first lens unit having a positive refractive power, a second lens unit having a negative refractive power, a third lens unit having a positive refractive power, and a fourth lens unit having a positive refractive power.

A general positive lead type zoom lens increases an interval between the first lens unit having a positive refractive power and the second lens unit having a negative refractive power significantly to change a focal length significantly. However, the first lens unit has a converging positive refractive power, and hence is not suited for achieving a super wide image pickup angle of view exceeding 100°. Therefore, when a wide angle of view is to be achieved, an effective diameter of the first lens unit is significantly increased.

In the zoom lens described in U.S. Patent Application Publication No. 2010/0302648, not only the interval between the first lens unit and the second lens unit is increased during zooming from a wide-angle end to a telephoto end, but also the composite lens unit, which is formed of the third lens unit and the fourth lens unit and has a strong positive refractive power, is extended significantly to the object side. In this manner, a rear principal point position of an entire system of the zoom lens is changed significantly from a position close to the image side to the object side. A distance from an image plane to the rear principal point of the entire system is equal to the focal length, and hence the movement is also important for achieving a high zoom ratio.

During zooming, one lens unit having a strong positive refractive power generates large variations in aberration. Therefore, the lens unit having the positive refractive power is divided into two lens units (third lens unit and fourth lens unit), and those two lens units are configured to move toward the object side while changing an interval therebetween.

The inventor of the present invention has found that adding elements of the positive lead type to the negative lead type zoom lens makes it easy to achieve a high zoom ratio while achieving a super wide angle of view. Specifically, the zoom lens has a configuration including, in order from an object side to an image side, a first lens unit having a negative refractive power, a second lens unit having a positive refractive power, a third lens unit having a negative refractive power, a fourth lens unit having a positive refractive power, and a fifth lens unit having a positive refractive power, in which the fourth lens unit, which is denoted by L4, and the fifth lens unit, which is denoted by L5, are configured to move toward the object side during zooming from a wide-angle end to a telephoto end.

The configuration of the fourth lens unit L4 having the positive refractive power and the fifth lens unit L5 having the positive refractive power tends to generate very large variations in aberration when a manufacturing error occurs in a relative relationship therebetween. In a negative lead case, in particular, a positive refractive power is strong, and hence significant variations in aberration due to the manufacturing error are generated. To address this problem, of the fourth lens unit L4 having the positive refractive power and the fifth lens unit L5 having the positive refractive power, the positive refractive power of the fifth lens unit L5, which is arranged on the image side, is set strong. A larger share of a main magnification action is given to the lens unit on the image side to set a positive refractive power on the object side, which has a high height h of incidence of an axial ray and tends to have large variations in aberration, relatively weak, to thereby decrease a reduction in optical performance due to the manufacturing error while suppressing the variations in aberration over the entire zoom range.

Next, a specific configuration of the zoom lens is described. A zoom lens according to each of Embodiments of the present invention includes, in order from an object side to an image side, the following lens units: a first lens unit L1 having a negative refractive power, a second lens unit L2 having a positive refractive power, a third lens unit L3 having a negative refractive power, a fourth lens unit L4 having a positive refractive power, and a fifth lens unit L5 having a positive refractive power. The second lens unit L2, the fourth lens unit L4, and the fifth lens unit L5 are configured to move toward the object side during zooming from the wide-angle end to the telephoto end.

A focal length of the fourth lens unit L4 is represented by f4, and a focal length of the fifth lens unit L5 is represented by f5. An amount of movement of the fifth lens unit L5 during zooming from the wide-angle end to the telephoto end is represented by M5, and a focal length of an entire system of the zoom lens at the wide-angle end is represented by fw. The following conditional expressions are satisfied:

$$0.01 < f5/f4 < 0.50 \qquad (1); \text{ and}$$

$$1.8 < -M5/fw < 10.0 \qquad (2).$$

Here, an amount of movement of a lens unit corresponds to a difference between a position on an optical axis at the wide-angle end and a position on the optical axis at the telephoto end, and the amount of movement has a positive sign when the lens unit is positioned closer to the image side at the telephoto end than at the wide-angle end, and a negative sign when the lens unit is positioned closer to the object side at the telephoto end than at the wide-angle end. The second lens unit L2, the fourth lens unit L4, and the fifth lens unit L5 are all configured to move toward the object side during zooming from the wide-angle end to the telephoto end. As a result, a rear principal point position of the entire system is moved toward the object side effectively, to thereby make it easy to achieve the high zoom ratio.

The conditional expression (1) is intended to appropriately allocate the positive refractive power of the fourth lens unit L4 and the positive refractive power of the fifth lens unit L5. When the ratio exceeds the upper limit value of the conditional expression (1) and the positive refractive power of the fifth lens unit L5 is too weak, it becomes difficult to achieve the high zoom ratio. Further, when the positive refractive power of the fourth lens unit L4 becomes much stronger to generate the manufacturing error in the relative relationship between the fourth lens unit L4 and the fifth lens unit L5, a change in optical performance becomes disadvantageously larger. When the ratio falls below the lower limit value of the conditional expression (1) and the positive refractive power of the fifth lens unit L5 is too strong, a variation in spherical aberration becomes much larger during zooming.

The conditional expression (2) is intended to secure a sufficient amount of movement of the fifth lens unit L5 during zooming for effective magnification. When the ratio exceeds the upper limit value of the conditional expression (2) and the amount of movement of the fifth lens unit L5 is too large, the entire system is increased in size. When the ratio falls below the lower limit value of the conditional expression (2) and the amount of movement of the fifth lens unit L5 is too small, the magnification effect becomes smaller, and it becomes difficult to achieve the high zoom ratio.

It is more preferred for the numerical ranges of the conditional expressions (1) and (2) to satisfy the following conditional expressions:

$$0.02<f5/f4<0.50 \quad (1a); \text{ and}$$

$$2.0<-M5/fw<4.0 \quad (2a).$$

Next, a more preferred configuration of the zoom lens of each of Embodiments is described. An amount of movement of the second lens unit L2 during zooming from the wide-angle end to the telephoto end is represented by M2. A focal length of the first lens unit L1 is represented by f1, a focal length of the second lens unit is represented by f2, and a focal length of the third lens unit is represented by f3. At this time, it is preferred to satisfy one or more of the following conditional expressions:

$$1.5<-M2/fw<5.0 \quad (3);$$

$$1.0<-f1/fw<1.8 \quad (4);$$

$$1.0<f2/fw<2.0 \quad (5);$$

$$1.2<-f3/fw<2.5 \quad (6);$$

$$5.0<f4/fw<200.0 \quad (7); \text{ and}$$

$$2.0<f5/fw<5.0 \quad (8).$$

Next, technical meanings of the above-mentioned respective conditional expressions are described. The conditional expression (3) is intended to optimize the movement of the second lens unit L2 during zooming. When the ratio exceeds the upper limit value of the conditional expression (3) and the amount of movement of the second lens unit L2 is too large, variations in spherical aberration become larger during zooming. When the ratio falls below the lower limit value of the conditional expression (3) and the amount of movement of the second lens unit L2 is too small, it becomes difficult to move the rear principal point position of the entire system toward the object side effectively, and it becomes difficult to obtain a magnification ratio. It is more preferred for the numerical range of the conditional expression (3) to satisfy the following conditional expression (3a):

$$1.8<-M2/fw<3.0 \quad (3a).$$

The conditional expressions (4), (5), (6), (7), and (8) are respectively intended to optimize the refractive powers of the first lens unit L1 to the fifth lens unit L5, to thereby downsize the entire system while reducing the variations in aberration during zooming. When the ratio exceeds the upper limit value of the conditional expression (4) and the negative refractive power of the first lens unit L1 is too weak (absolute value of the negative refractive power is too small), it becomes difficult to achieve a wide angle of view at the wide-angle end. When the ratio falls below the lower limit value of the conditional expression (4) and the negative refractive power of the first lens unit L1 is too strong (absolute value of the negative refractive power is too large), sagittal curvature of field and distortion are increased at the wide-angle end, and it becomes difficult to correct those various aberrations.

When the ratio exceeds the upper limit value of the conditional expression (5) and the positive refractive power of the second lens unit L2 is too weak, it becomes difficult to secure a sufficient magnification ratio. When the ratio falls below the lower limit value of the conditional expression (5) and the positive refractive power of the second lens unit L2 is too strong, large astigmatism is generated at the telephoto end, and it becomes difficult to correct the aberration. When the ratio exceeds the upper limit value of the conditional expression (6) and the negative refractive power of the third lens unit L3 is too weak, it becomes difficult to secure the sufficient magnification ratio with a change in interval between the second lens unit L2 and the third lens unit L3. When the ratio falls below the lower limit value of the conditional expression (6) and the negative refractive power of the third lens unit L3 is too strong, spherical aberration is disadvantageously overcorrected at the telephoto end.

When the ratio exceeds the upper limit value of the conditional expression (7) and the positive refractive power of the fourth lens unit L4 is too weak, it becomes difficult to secure a sufficient magnification ratio with the movement of the fourth lens unit L4 during zooming. When the ratio falls below the lower limit value of the conditional expression (7) and the positive refractive power of the fourth lens unit L4 is too strong, large spherical aberration is disadvantageously generated at the telephoto end. When the ratio exceeds the upper limit value of the conditional expression (8) and the positive refractive power of the fifth lens unit L5 is too weak, it becomes difficult to secure the sufficient magnification ratio with the movement of the fifth lens unit L5 during zooming. When the ratio falls below the lower limit value of the conditional expression (8) and the positive refractive power of the fifth lens unit L5 is too strong, large spherical aberration is disadvantageously generated at the telephoto end.

It is more preferred for the numerical ranges of the conditional expressions (4) to (8) to satisfy the following conditional expressions:

$$1.1<-f1/fw<1.5 \quad (4a);$$

$$1.2<f2/fw<1.8 \quad (5a);$$

$$1.3<-f3/fw<2.3 \quad (6a);$$

$$8.0<f4/fw<150.0 \quad (7a); \text{ and}$$

$$2.5<f5/fw<4.0 \quad (8a).$$

In the zoom lens according to each of Embodiments, it is preferred for the fourth lens unit L4 and the fifth lens unit L5 to be configured to move so as to reduce the interval between the fourth lens unit L4 and the fifth lens unit L5 during zooming from the wide-angle end to the telephoto end. As a result, the amount of movement of the fifth lens unit L5, which has the strong refractive power, may be increased to effectively perform magnification.

It is preferred for the fourth lens unit L4 to include two positive lenses and one negative lens. It is also preferred for the fifth lens unit L5 to include two positive lenses and one negative lens. As a result, it becomes easy to correct aberrations in the fourth lens unit L4 and the fifth lens unit L5 while both of the fourth lens unit L4 and the fifth lens unit L5 secure the positive refractive powers. It becomes easy to reduce the variations in aberration when those lens units are moved by a large amount during zooming. When the fourth lens unit L4 and the fifth lens unit L5 are configured as described above, in particular, it becomes easy to reduce the size of the entire system, and it is more preferred.

The zoom lens according to each of Embodiments 1 to 3 of the present invention includes five lens units, and the five lens units consist of, in order from an object side to an image side, the following lens units: a first lens unit L1 having a negative refractive power, a second lens unit L2 having a positive refractive power, a third lens unit L3 having a negative refractive power, a fourth lens unit L4 having a positive refractive power, and a fifth lens unit L5 having a positive refractive power. Moreover, the first lens unit L1 is configured to move toward the image side and then toward the object side during zooming from the wide-angle end to the telephoto end. All of the second lens unit L2 to the fifth lens unit L5 are configured to move toward the object side.

At the telephoto end than at the wide-angle end, an interval between the first lens unit L1 and the second lens unit L2 becomes smaller, an interval between the second lens unit L2 and the third lens unit L3 becomes larger, and an interval between the third lens unit L3 and the fourth lens unit L4 becomes smaller. As a result, an interval between the fourth lens unit L4 and the fifth lens unit L5 also becomes smaller, to thereby perform magnification effectively while suppressing the variations in aberration.

Moreover, the fourth lens unit L4 consists of the two positive lenses and the one negative lens, and the fifth lens unit L5 consists of the two positive lenses and the one negative lens to reduce the size of the entire system while suppressing the aberrations generated from the fourth lens unit L4 and the fifth lens unit L5. Moreover, the second lens unit L2 is configured to move toward the object side during focusing from infinity to proximity. Further, in order to suppress the variations in aberration during focusing, the third lens unit L3 is configured to move toward the object side near the wide-angle end, and toward the image side near the telephoto end.

The zoom lens according to Embodiment 4 of the present invention includes six lens units, and the six lens units consist of, in order from an object side to an image side, a first lens unit L1 having a negative refractive power, a second lens unit L2 having a positive refractive power, a third lens unit L3 having a negative refractive power, a fourth lens unit L4 having a positive refractive power, a fifth lens unit L5 having a positive refractive power, and a sixth lens unit L6 having a positive refractive power. Embodiment 4 is different from the other Embodiments in including the sixth lens unit L6 having the positive refractive power, which is arranged on the image side of the fifth lens unit L5 and is configured not to move during zooming, to thereby improve telecentricity with respect to an image plane, and is similar to the other Embodiments in configurations and optical actions of the other lens units.

Next, Embodiment in which the zoom lens described in Embodiments 1 to 4 is applied to an image pickup apparatus is described with reference to FIG. 9.

The image pickup apparatus according to Embodiment includes an interchangeable lens apparatus including the zoom lens, and a camera main body. The camera main body is connected to the interchangeable lens apparatus via a camera mount portion in an attachable and detachable manner and includes an image pickup element configured to receive an optical image formed by the zoom lens and convert the optical image into an electric image signal.

FIG. 9 is a schematic diagram of a main part of a single-lens reflex camera. In FIG. 9, an image pickup lens 10 includes a zoom lens 1 of Embodiments 1 to 4. The zoom lens 1 is held by a lens barrel 2 serving as a holding member.

A camera main body 20 includes a quick return mirror 3 for reflecting a light flux from the image pickup lens 10 to the upward direction, and a reticle plate 4 arranged in an image forming apparatus for the image pickup lens 10. The camera main body 20 further includes a roof pentaprism 5 for converting an inverse image formed on the reticle plate 4 into an erect image, and an eyepiece lens 6 for observing the erect image.

As a photosensitive plane 7, there is arranged a solid-state image pickup element (photoelectric conversion element) such as a CCD sensor or a CMOS sensor for receiving the image formed by the zoom lens, or a silver-halide film. When taking an image, the quick return mirror 3 is retracted from the optical path, and an image is formed on the photosensitive plane 7 by the image pickup lens 10. Benefits described in Embodiments 1 to 4 are effectively enjoyed by the image pickup apparatus disclosed in this Embodiment. The present invention can be also applied to a mirrorless single-lens reflex camera without the quick return mirror 3 as the image pickup apparatus.

Next, Numerical Data 1 to 4 of Embodiments 1 to 4 are shown. In each Numerical Data, i represents the order of a surface from the object side, ri represents a curvature radius of the i-th lens surface, di represents a lens thickness or an air interval between the i-th surface and the (i+1)-th surface, and ndi and νdi represent a refractive index and an Abbe number of a medium between the i-th surface and the (i+1)-th surface with respect to a d-line, respectively. Moreover, an effective diameter of the i-th surface is also shown. BF represents a back focus, and is expressed as a distance from the last lens surface to the image plane. An entire length of the zoom lens is a value obtained by adding the back focus to a distance from the first lens surface to the last lens surface.

A focal length and an f number are also shown. A half angle of view is half an image pickup angle of view of the entire system. An image height is a maximum image height, which determines the half angle of view. Moreover, zoom lens unit data show a focal length, a length on the optical axis, a front principal point position, and a rear principal point position of each lens unit. An aspherical shape is expressed by the following equation:

$$X = \frac{(1/R) \times R^2}{1 + \sqrt{1 - (1+K)(H/R)^2}} + A4 \times H^4 + A6 \times H^6 + A8 \times H^8 + A10 \times H^{10} + A12 \times H^{12}$$

where the X axis corresponds to the optical axis direction, the H axis corresponds to the direction perpendicular to the optical axis, the light propagation direction is positive, R represents a paraxial curvature radius, K represents a conic constant, and A4, A6, A8, A10, and A12, each represent an aspherical coefficient. In addition, [e+X] means [×10$^{+X}$], and [e−X] means [×10$^{−X}$]. The aspherical surface is indicated by adding * as a suffix to surface number. In addition, the part where an interval d between optical surfaces is (variable) is changed during zooming, and the interval between surfaces corresponding to the focal length is shown in an annexed table. In addition, a relationship among the parameters, the conditional expressions, and the numerical data are shown in Table 1.

(Numerical Data 1)

Unit mm

Surface data

| Surface number i | ri | di | ndi | vdi | Effective diameter |
|---|---|---|---|---|---|
| 1* | 537.395 | 2.50 | 1.88300 | 40.8 | 56.80 |
| 2 | 23.089 | 14.52 | | | 40.66 |
| 3* | −45.137 | 2.00 | 1.58313 | 59.4 | 40.56 |
| 4* | 4,062.439 | 0.72 | | | 39.60 |
| 5 | 49.164 | 3.23 | 1.85478 | 24.8 | 39.50 |
| 6 | 87.076 | (Variable) | | | 38.97 |
| 7* | 36.237 | 2.58 | 1.76385 | 48.5 | 25.07 |
| 8 | 101.109 | 1.10 | 1.85478 | 24.8 | 24.70 |
| 9 | 33.901 | 3.80 | 1.60311 | 60.6 | 23.98 |
| 10 | −221.959 | 0.15 | | | 23.70 |
| 11 | 45.081 | 3.44 | 1.76385 | 48.5 | 22.94 |
| 12 | −90.154 | (Variable) | | | 22.64 |
| 13 | −2,966.530 | 0.80 | 1.77250 | 49.6 | 16.99 |
| 14 | 25.017 | 2.48 | | | 15.86 |
| 15 | −37.188 | 0.80 | 1.69680 | 55.5 | 15.70 |
| 16 | 25.659 | 3.06 | 1.84666 | 23.8 | 15.99 |
| 17 | −115.833 | (Variable) | | | 16.23 |
| 18 | ∞ | (Variable) | | | 14.96 (Stop) |
| 19 | ∞ | (Variable) | | | 16.86 (Flare cut stop) |
| 20 | 30.222 | 5.05 | 1.43875 | 94.9 | 17.73 |
| 21 | −24.058 | 0.15 | | | 17.88 |
| 22 | −71.604 | 4.29 | 1.59551 | 39.2 | 17.88 |
| 23 | −15.776 | 1.10 | 1.85478 | 24.8 | 18.10 |
| 24 | 170.926 | (Variable) | | | 19.31 |
| 25 | 28.323 | 5.54 | 1.49700 | 81.5 | 24.00 |
| 26 | −68.965 | 0.15 | | | 24.27 |
| 27 | 239.109 | 1.40 | 1.91082 | 35.3 | 24.34 |
| 28 | 16.336 | 7.17 | 1.78472 | 25.7 | 24.17 |
| 29* | 297.265 | | | | 24.49 |

Aspherical surface data

First surface

K = 0.00000e+000  A4 = 1.63907e−005  A6 = −3.32613e−008
A8 = 4.50042e−011  A10 = −3.33068e−014  A12 = 1.04006e−017

Third surface

K = 0.00000e+000  A4 = 2.31914e−005  A6 = 2.33947e−008
A8 = −1.72221e−010  A10 = 1.71151e−013

Fourth surface

K = 0.00000e+000  A4 = 3.10872e−005  A6 = −1.06760e−009
A8 = −2.17700e−010  A10 = 3.11083e−013  A12 = −7.00040e−017

Seventh surface

K = 0.00000e+000  A4 = −7.12653e−006  A6 = 1.85190e−009
A8 = −4.40286e−011  A10 = 1.04698e−013

Twenty-ninth surface

K = 0.00000e+000  A4 = 1.30886e−005  A6 = 6.55276e−009
A8 = 1.09610e−011  A10 = −3.20778e−014

Various data
Zoom ratio 3.91

| | Wide angle | Intermediate | Telephoto |
|---|---|---|---|
| Focal length | 17.40 | 35.00 | 68.00 |
| F number | 3.59 | 4.42 | 6.43 |
| Half angle of view (degrees) | 51.19 | 31.72 | 17.65 |
| Image height | 21.64 | 21.64 | 21.64 |
| Entire length of zoom lens | 168.43 | 152.82 | 168.45 |
| BF | 38.41 | 52.81 | 82.55 |
| d6 | 37.50 | 11.29 | 1.00 |
| d12 | 2.50 | 8.69 | 15.02 |
| d17 | 11.42 | 5.73 | 1.22 |
| d18 | 1.10 | 4.91 | 1.80 |
| d19 | 7.00 | 0.00 | 0.00 |
| d24 | 4.45 | 3.34 | 0.80 |

Zoom lens unit data

| Unit | First surface | Focal length | Lens unit structure length | Front principal point position | Rear principal point position |
|---|---|---|---|---|---|
| 1 | 1 | −22.45 | 22.98 | 3.12 | −15.46 |
| 2 | 7 | 24.91 | 11.07 | 3.25 | −3.63 |
| 3 | 13 | −27.55 | 7.14 | 0.31 | −4.85 |
| 4 | 18 | ∞ | 0.00 | 0.00 | −0.00 |
| 5 | 19 | ∞ | 0.00 | 0.00 | −0.00 |
| 6 | 20 | 194.43 | 10.60 | −20.13 | −24.48 |
| 7 | 25 | 53.71 | 14.27 | −0.88 | −9.27 |

(Numerical Data 2)

Unit mm

Surface data

| Surface number i | ri | di | ndi | vdi | Effective diameter |
|---|---|---|---|---|---|
| 1* | 278.277 | 2.50 | 1.88300 | 40.8 | 54.58 |
| 2 | 21.191 | 14.52 | | | 38.31 |
| 3* | −44.561 | 2.00 | 1.58313 | 59.4 | 38.19 |
| 4* | 155.886 | 1.55 | | | 37.25 |
| 5 | 46.200 | 3.49 | 1.85478 | 24.8 | 37.36 |
| 6 | 103.429 | (Variable) | | | 36.91 |
| 7* | 42.949 | 2.19 | 1.76385 | 48.5 | 24.33 |
| 8 | 134.880 | 0.66 | | | 23.97 |
| 9 | −348.252 | 1.10 | 1.85478 | 24.8 | 24.00 |
| 10 | 63.875 | 3.09 | 1.60311 | 60.6 | 23.52 |
| 11 | −65.667 | 0.15 | | | 23.36 |
| 12 | 43.352 | 2.98 | 1.76385 | 48.5 | 22.00 |
| 13 | −93.530 | (Variable) | | | 21.50 |
| 14 | 817.534 | 0.80 | 1.77250 | 49.6 | 15.52 |
| 15 | 31.483 | 1.99 | | | 15.20 |
| 16 | −52.287 | 0.80 | 1.69680 | 55.5 | 15.22 |
| 17 | 22.300 | 2.87 | 1.84666 | 23.8 | 15.62 |
| 18 | 728.846 | (Variable) | | | 15.73 |
| 19 | ∞ | (Variable) | | | 14.60 (Stop) |
| 20 | ∞ | (Variable) | | | 16.22 (Flare cut stop) |
| 21 | 31.963 | 4.57 | 1.43875 | 94.9 | 16.38 |
| 22 | −21.134 | 0.15 | | | 16.27 |
| 23 | −36.010 | 3.76 | 1.59551 | 39.2 | 15.86 |
| 24 | −13.855 | 1.10 | 1.85478 | 24.8 | 16.27 |
| 25 | −737.997 | (Variable) | | | 17.63 |
| 26 | 33.521 | 6.23 | 1.49700 | 81.5 | 24.37 |
| 27 | −36.964 | 0.15 | | | 24.76 |
| 28 | −457.723 | 1.40 | 1.91082 | 35.3 | 24.71 |
| 29 | 16.353 | 7.98 | 1.78472 | 25.7 | 24.81 |
| 30* | −428.902 | | | | 25.27 |

Aspherical surface data

First surface

K = 0.00000e+000  A4 = 1.81592e−005  A6 = −3.58875e−008
A8 = 4.56162e−011  A10 = −3.23858e−014  A12 = 1.00283e−017

Third surface

K = 0.00000e+000  A4 = 2.12827e−005  A6 = 2.55821e−008
A8 = −1.60949e−010  A10 = 1.46359e−013

-continued

Unit mm

Fourth surface

K = 0.00000e+000  A4 = 3.16805e-005  A6 = -6.28367e-009
A8 = -2.31433e-010  A10 = 3.19790e-013  A12 = -5.30362e-017

Seventh surface

K = 0.00000e+000  A4 = -6.44331e-006  A6 = 3.32402e-009
A8 = -6.66211e-011  A10 = 1.91836e-013

Thirtieth surface

K = 0.00000e+000  A4 = 1.11558e-005  A6 = 7.60568e-009
A8 = -2.15656e-011  A10 = 9.08224e-014

Various data
Zoom ratio 3.56

| | Wide angle | Intermediate | Telephoto |
|---|---|---|---|
| Focal length | 16.30 | 24.10 | 58.00 |
| F number | 3.59 | 3.94 | 6.37 |
| Half angle of view (degrees) | 53.01 | 41.92 | 20.46 |
| Image height | 21.64 | 21.64 | 21.64 |
| Entire length of zoom lens | 168.47 | 154.71 | 168.42 |
| BF | 38.42 | 45.65 | 83.75 |
| d6 | 36.82 | 19.15 | 1.00 |
| d13 | 2.50 | 5.94 | 13.53 |
| d18 | 11.17 | 5.94 | 1.54 |
| d19 | 0.15 | 7.61 | 1.80 |
| d20 | 7.00 | 0.00 | 0.00 |
| d25 | 6.41 | 4.41 | 0.80 |

Zoom lens unit data

| Unit | First surface | Focal length | Lens unit structure length | Front principal point position | Rear principal point position |
|---|---|---|---|---|---|
| 1 | 1 | -21.03 | 24.05 | 3.12 | -16.57 |
| 2 | 7 | 25.72 | 10.17 | 3.89 | -2.66 |
| 3 | 14 | -31.58 | 6.46 | 0.93 | -3.52 |
| 4 | 19 | ∞ | 0.00 | 0.00 | -0.00 |
| 5 | 20 | ∞ | 0.00 | 0.00 | -0.00 |
| 6 | 21 | 530.62 | 9.57 | -46.28 | -48.36 |
| 7 | 26 | 49.88 | 15.75 | 1.30 | -8.35 |

(Numerical Data 3)

Unit mm

Surface data

| Surface number i | ri | di | ndi | vdi | Effective diameter |
|---|---|---|---|---|---|
| 1* | 958.723 | 2.50 | 1.88300 | 40.8 | 55.17 |
| 2 | 22.813 | 14.52 | | | 39.99 |
| 3* | -38.999 | 2.00 | 1.49700 | 81.5 | 39.93 |
| 4* | -33,506.626 | 0.15 | | | 39.49 |
| 5 | 52.371 | 2.40 | 1.85478 | 24.8 | 39.60 |
| 6 | 72.902 | 0.56 | | | 39.21 |
| 7 | 56.416 | 2.84 | 1.83400 | 37.2 | 39.02 |
| 8 | 101.653 | (Variable) | | | 38.53 |
| 9* | 45.339 | 2.40 | 1.76385 | 48.5 | 23.84 |
| 10 | 237.789 | 0.15 | | | 23.71 |
| 11 | 273.374 | 1.10 | 1.85478 | 24.8 | 23.70 |
| 12 | 43.549 | 3.01 | 1.60311 | 60.6 | 23.45 |
| 13 | -332.206 | 0.15 | | | 23.41 |
| 14 | 52.749 | 3.24 | 1.76385 | 48.5 | 23.25 |
| 15 | -88.960 | (Variable) | | | 22.96 |
| 16 | -200.548 | 0.80 | 1.77250 | 49.6 | 16.78 |
| 17 | 39.184 | 2.22 | | | 16.52 |
| 18 | -41.141 | 0.80 | 1.69680 | 55.5 | 16.56 |
| 19 | 29.007 | 3.17 | 1.84666 | 23.8 | 17.20 |
| 20 | -103.548 | (Variable) | | | 17.42 |
| 21 | ∞ | (Variable) | | | 16.11 (Stop) |
| 22 | ∞ | (Variable) | | | 17.84 (Flare cut stop) |
| 23 | 29.561 | 4.84 | 1.43875 | 94.9 | 18.02 |
| 24 | -27.075 | 0.15 | | | 17.93 |
| 25 | -78.232 | 4.00 | 1.59551 | 39.2 | 17.61 |
| 26 | -16.308 | 1.00 | 1.85478 | 24.8 | 17.72 |
| 27 | 179.749 | (Variable) | | | 18.77 |
| 28 | 45.338 | 5.32 | 1.43875 | 94.9 | 21.73 |
| 29 | -25.317 | 0.15 | | | 22.10 |
| 30* | 152.185 | 6.95 | 1.80518 | 25.4 | 21.95 |
| 31 | -15.432 | 1.30 | 1.91082 | 35.3 | 21.85 |
| 32 | 69.476 | | | | 22.32 |

Aspherical surface data

First surface

K = 0.00000e+000  A4 = 1.73141e-005  A6 = -3.50886e-00
A8 = 4.58424e-011  A10 = -3.29609e-014  A12 = 9.89773e-018

Third surface

K = 0.00000e+000  A4 = 2.25182e-005  A6 = 3.15320e-008
A8 = -1.56515e-010  Al0 = 1.37594e-013

Fourth surface

K = 0.00000e+000  A4 = 3.37748e-005  A6 = -1.53200e-009
A8 = -2.14416e-010  A10 = 3.29698e-013  A12 = -1.58448e-016

Ninth surface

K = 0.00000e+000  A4 = -4.16122e-006  A6 = -2.95417e-009
A8 = -5.24604e-012  A10 = -2.08528e-015

Thirtieth surface

K = 0.00000e+000  A4 = -1.11142e-005  A6 = 5.89982e-009
A8 = -1.17086e-010  A10 = 5.84177e-013

Various data
Zoom ratio 3.72

| | Wide angle | Intermediate | Telephoto |
|---|---|---|---|
| Focal length | 18.30 | 29.41 | 68.00 |
| F number | 3.59 | 4.11 | 6.36 |
| Half angle of view (degrees) | 49.77 | 36.34 | 17.65 |
| Image height | 21.64 | 21.64 | 21.64 |
| Entire length of zoom lens | 168.46 | 154.65 | 168.42 |
| BF | 38.44 | 47.16 | 81.23 |
| d8 | 41.80 | 19.60 | 1.00 |
| d15 | 2.50 | 7.03 | 16.73 |
| d20 | 9.39 | 6.39 | 1.13 |
| d21 | 0.06 | 5.08 | 1.80 |
| d22 | 7.00 | 0.00 | 0.00 |
| d27 | 3.54 | 3.66 | 0.80 |

Zoom lens unit data

| Unit | First surface | Focal length | Lens unit structure length | Front principal point position | Rear principal point position |
|---|---|---|---|---|---|
| 1 | 1 | -25.30 | 24.97 | 1.76 | -18.70 |
| 2 | 9 | 29.23 | 10.06 | 3.11 | -3.12 |
| 3 | 16 | -37.56 | 6.99 | -0.10 | -5.08 |
| 4 | 21 | ∞ | 0.00 | 0.00 | -0.00 |
| 5 | 22 | ∞ | 0.00 | 0.00 | -0.00 |
| 6 | 23 | 211.59 | 9.98 | -20.65 | -24.75 |
| 7 | 28 | 66.88 | 13.72 | -4.76 | -11.93 |

(Numerical Data 4)

Unit mm

Surface data

| Surface number i | ri | di | ndi | vdi | Effective diameter |
|---|---|---|---|---|---|
| 1* | 913.210 | 2.50 | 1.88300 | 40.8 | 57.69 |
| 2 | 24.742 | 14.48 | | | 42.00 |
| 3* | −47.270 | 2.00 | 1.58313 | 59.4 | 41.87 |
| 4* | −330.989 | 0.80 | | | 41.12 |
| 5 | 70.885 | 2.15 | 1.85478 | 24.8 | 40.52 |
| 6 | 112.075 | (Variable) | | | 40.12 |
| 7* | 40.650 | 1.78 | 1.76385 | 48.5 | 26.45 |
| 8 | 73.195 | 1.10 | 1.85478 | 24.8 | 26.20 |
| 9 | 34.908 | 3.57 | 1.60311 | 60.6 | 25.60 |
| 10 | −297.365 | 0.15 | | | 25.45 |
| 11 | 40.971 | 3.99 | 1.76385 | 48.5 | 24.93 |
| 12 | −72.737 | (Variable) | | | 24.64 |
| 13 | −91.152 | 0.80 | 1.88300 | 40.8 | 16.72 |
| 14 | 27.260 | 1.84 | | | 15.73 |
| 15 | −50.471 | 0.80 | 1.60311 | 60.6 | 15.71 |
| 16 | 21.944 | 2.88 | 1.84666 | 23.8 | 15.58 |
| 17 | −141.090 | (Variable) | | | 15.41 |
| 18 | ∞ | (Variable) | | | 14.76 (Stop) |
| 19 | ∞ | (Variable) | | | 15.16 (Flare cut stop) |
| 20 | 42.515 | 4.63 | 1.43875 | 94.9 | 16.85 |
| 21 | −21.437 | 0.15 | | | 17.12 |
| 22 | −57.542 | 4.37 | 1.60342 | 38.0 | 16.97 |
| 23 | −14.027 | 1.10 | 1.85478 | 24.8 | 17.34 |
| 24 | 231.756 | (Variable) | | | 18.90 |
| 25 | 33.115 | 6.01 | 1.49700 | 81.5 | 23.13 |
| 26 | −33.760 | 0.15 | | | 23.55 |
| 27 | −491.452 | 1.40 | 1.91082 | 35.3 | 23.70 |
| 28 | 19.472 | 5.63 | 1.84666 | 23.8 | 24.04 |
| 29* | 118.661 | (Variable) | | | 24.33 |
| 30 | 55.367 | 2.86 | 1.60562 | 43.7 | 36.99 |
| 31 | 100.000 | | | | 36.93 |

Aspherical surface data

First surface

K = 0.00000e+000  A4 = 1.58562e−005  A6 = −3.31791e−008
A8 = 4.52460e−011  A10 = −3.35869e−014  A12 = 1.06772e−017

Third surface

K = 0.00000e+000  A4 = 2.07581e−005  A6 = 2.53833e−008
A8 = −1.80510e−010  A10 = 1.73174e−013

Fourth surface

K = 0.00000e+000  A4 = 2.69573e−005  A6 = −1.07657e−009
A8 = −2.18821e−010  A10 = 3.27434e−013  A12 = −8.77530e−017

Seventh surface

K = 0.00000e+000  A4 = −7.25750e−006  A6 = −1.40330e−009
A8 = −3.97784e−011  A10 = 1.00700e−013

Twenty-ninth surface

K = 0.00000e+000  A4 = 1.16893e−005  A6 = 1.26994e−008
A8 = −2.89396e−011  A10 = 2.18279e−013

Various data
Zoom ratio 3.91

| | Wide angle | Intermediate | Telephoto |
|---|---|---|---|
| Focal length | 17.40 | 35.00 | 68.00 |
| F number | 3.59 | 4.44 | 5.81 |
| Half angle of view (degrees) | 51.19 | 31.72 | 17.65 |
| Image height | 21.64 | 21.64 | 21.64 |
| Entire length of zoom lens | 166.61 | 156.30 | 168.46 |
| BF | 38.90 | 38.91 | 38.94 |

Unit mm

| | | | |
|---|---|---|---|
| d6 | 36.78 | 11.54 | 1.00 |
| d12 | 2.50 | 8.89 | 17.53 |
| d17 | 12.16 | 11.20 | 1.31 |
| d18 | 0.15 | −0.01 | 1.80 |
| d19 | 7.00 | 0.00 | 0.00 |
| d24 | 3.49 | 3.98 | 0.80 |
| d29 | 0.50 | 16.66 | 41.94 |

Zoom lens unit data

| Unit | First surface | Focal length | Lens unit structure length | Front principal point position | Rear principal point position |
|---|---|---|---|---|---|
| 1 | 1 | −22.95 | 21.93 | 3.29 | −14.79 |
| 2 | 7 | 24.10 | 10.60 | 3.28 | −3.26 |
| 3 | 13 | −27.96 | 6.32 | −0.46 | −4.92 |
| 4 | 18 | ∞ | 0.00 | 0.00 | −0.00 |
| 5 | 19 | ∞ | 0.00 | 0.00 | −0.00 |
| 6 | 20 | 2,431.14 | 10.25 | −246.41 | −229.76 |
| 7 | 25 | 55.30 | 13.19 | −1.12 | −8.73 |
| 8 | 30 | 200.00 | 2.86 | −2.16 | −3.90 |

TABLE 1

| | | Numerical Data 1 | Numerical Data 2 | Numerical Data 3 | Numerical Data 4 |
|---|---|---|---|---|---|
| fw | | 17.399 | 16.300 | 18.300 | 17.400 |
| ft | | 67.997 | 58.000 | 68.001 | 68.000 |
| f1 | | −22.446 | −21.030 | −25.299 | −22.950 |
| f2 | | 24.905 | 25.722 | 29.234 | 24.100 |
| f3 | | −27.547 | −31.579 | −37.560 | −27.956 |
| f4 | | 194.429 | 530.616 | 211.592 | 2,431.139 |
| f5 | | 53.713 | 49.879 | 66.881 | 55.297 |
| M2 | | −36.527 | −35.820 | −40.805 | −37.654 |
| M5 | | −44.146 | −45.328 | −42.790 | −41.436 |
| Conditional Expression'(1) | f5/f4 | 0.276 | 0.094 | 0.316 | 0.023 |
| Conditional Expression'(2) | −M5/fw | 2.537 | 2.781 | 2.338 | 2.381 |
| Conditional Expression'(3) | −M2/fw | 2.099 | 2.198 | 2.230 | 2.164 |
| Conditional Expression'(4) | −f1/fw | 1.290 | 1.290 | 1.382 | 1.319 |
| Conditional Expression'(5) | f2/fw | 1.431 | 1.578 | 1.597 | 1.385 |
| Conditional Expression'(6) | −f3/fw | 1.583 | 1.937 | 2.052 | 1.607 |
| Conditional Expression'(7) | f4/fw | 11.175 | 32.553 | 11.562 | 139.721 |
| Conditional Expression'(8) | f5/fw | 3.087 | 3.060 | 3.655 | 3.178 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-057114, filed Mar. 23, 2017, which is hereby incorporated by reference herein in its entirety.

What is claimed is:

1. A zoom lens, comprising, in order from an object side to an image side:
a first lens unit having a negative refractive power;
a second lens unit having a positive refractive power;
a third lens unit having a negative refractive power;
a fourth lens unit having a positive refractive power; and a fifth lens unit having a positive refractive power, wherein an interval between each pair of adjacent lens units is changed for zooming, wherein the second lens unit, the fourth lens unit, and the fifth lens unit are configured to move toward the object side for zooming from a wide-angle end to a telephoto end, and wherein the following conditional expressions are satisfied $0.01 < f5/f4 < 0.50$; and $1.8 < -M5/fw < 10.0$, where f4 represents a focal length of the fourth lens unit, f5 represents a focal length of the fifth lens unit, M5 represents an amount of movement of the fifth lens unit for zooming from the wide-angle end to the telephoto end, and fw represents a focal length of the zoom lens at the wide-angle end, the amount of movement having a positive sign when a lens unit is positioned closer to the image side at the telephoto end than at the wide-angle end, and a negative sign when the lens unit is positioned closer to the object side at the telephoto end than at the wide-angle end.

2. The zoom lens according to claim 1, wherein the fourth lens unit and the fifth lens unit are configured to move so as to reduce an interval between the fourth lens unit and the fifth lens unit for zooming from the wide-angle end to the telephoto end.

3. The zoom lens according to claim 1, wherein the following conditional expression is satisfied:

$1.5 < -M2/fw < 5.0$, where M2 represents an amount of movement of the second lens unit for zooming from the wide-angle end to the telephoto end.

4. The zoom lens according to claim 1, wherein the fifth lens unit comprises two positive lenses and one negative lens.

5. The zoom lens according to claim 1, wherein the fourth lens unit comprises two positive lenses and one negative lens.

6. The zoom lens according to claim 1, wherein the following conditional expression is satisfied:

$1.0 < -f1/fw < 1.8$, where f1 represents a focal length of the first lens unit.

7. The zoom lens according to claim 1, wherein the following conditional expression is satisfied:

$1.0 < f2/fw < 2.0$, where f2 represents a focal length of the second lens unit.

8. The zoom lens according to claim 1, wherein the following conditional expression is satisfied:

$2 < -f3/fw < 2.5$, where f3 represents a focal length of the third lens unit.

9. The zoom lens according to claim 1, wherein the following conditional expression is satisfied:

$5.0 < f4/fw < 200.0$.

10. The zoom lens according to claim 1, wherein the following conditional expression is satisfied:

$2.0 < f5/fw < 5.0$.

11. The zoom lens according to claim 1, wherein the first lens unit is configured to move toward the image side and then toward the object side for zooming from the wide-angle end to the telephoto end.

12. The zoom lens according to claim 1, wherein the third lens unit is configured to move toward the object side for zooming from the wide-angle end to the telephoto end.

13. The zoom lens according to claim 1, further comprising a sixth lens unit having a positive refractive power, which is arranged on the image side of the fifth lens unit, and is configured not to move for zooming.

14. An image pickup apparatus, comprising:

a zoom lens; and a photoelectric conversion element, which is configured to receive an image formed by the zoom lens, wherein the zoom lens comprises, in order from an object side to an image side:

a first lens unit having a negative refractive power;

a second lens unit having a positive refractive power;

a third lens unit having a negative refractive power;

a fourth lens unit having a positive refractive power; and a fifth lens unit having a positive refractive power, wherein an interval between each pair of adjacent lens units is changed for zooming, wherein the second lens unit, the fourth lens unit, and the fifth lens unit are configured to move toward the object side for zooming from a wide-angle end to a telephoto end, wherein the following conditional expressions are satisfied:

$0.01 < f5/f4 < 0.50$; and $1.8 < -M5/fw < 10.0$, where f4 represents a focal length of the fourth lens unit, f5 represents a focal length of the fifth lens unit, M5 represents an amount of movement of the fifth lens unit for zooming from the wide-angle end to the telephoto end, and fw represents a focal length of the zoom lens at the wide-angle end, the amount of movement having a positive sign when a lens unit is positioned closer to the image side at the telephoto end than at the wide-angle end, and a negative sign when the lens unit is positioned closer to the object side at the telephoto end than at the wide-angle end.

* * * * *